No. 763,909. PATENTED JUNE 28, 1904.
A. S. KROTZ.
RUBBER TIRE.
APPLICATION FILED DEC. 26, 1903.
NO MODEL.
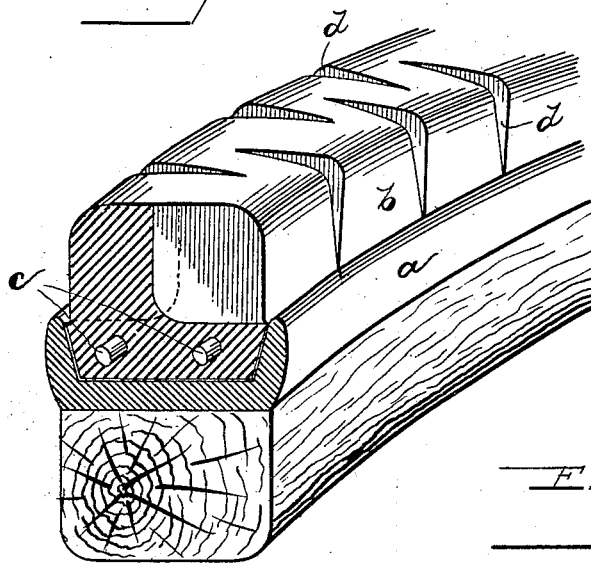
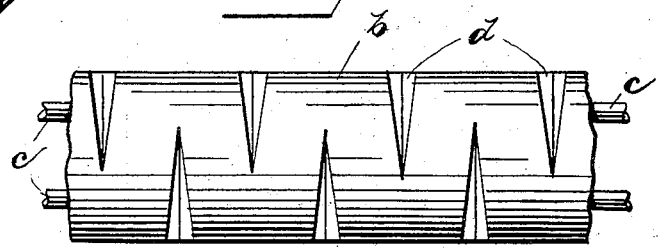
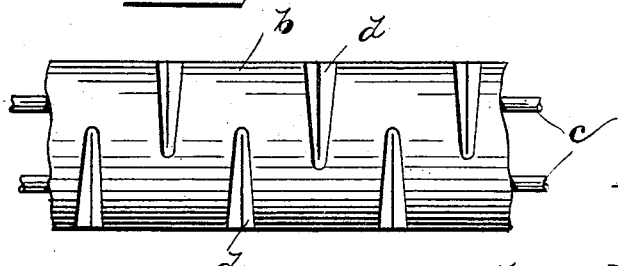
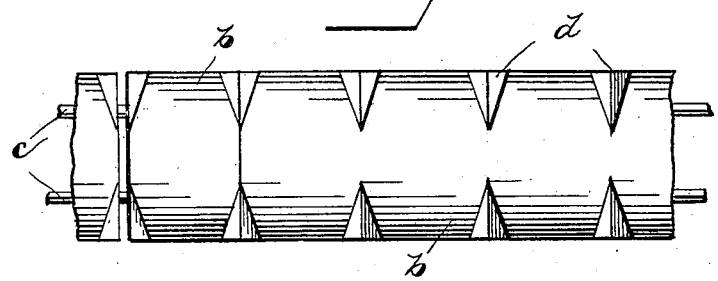
WITNESSES: INVENTOR.

No. 763,909. Patented June 28, 1904.

UNITED STATES PATENT OFFICE.

ALVARO S. KROTZ, OF SPRINGFIELD, OHIO, ASSIGNOR OF ONE-HALF TO PAUL A. STALEY, OF SPRINGFIELD, OHIO.

RUBBER TIRE.

SPECIFICATION forming part of Letters Patent No. 763,909, dated June 28, 1904.

Application filed December 26, 1903. Serial No. 186,648. (No model.)

*To all whom it may concern:*

Be it known that I, ALVARO S. KROTZ, a citizen of the United States, residing at 272 Clifton avenue, Springfield, in the county of Clark and State of Ohio, have invented certain new and useful Improvements in Rubber Tires; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in rubber tires for vehicle-wheels.

My invention consists in the construction and combination of parts hereinafter set forth in the specification and claims.

The object of my invention is to provide a rubber tire having a metallic supporting seat or channel and firmly held in place thereon, which tire shall be in its nature a cushion tire and adapted to compensate for various shocks and strains which come upon a tire of this kind and provide for taking care of such shocks without unduly taxing or displacing the rubber. I attain these objects by the construction shown in the accompanying drawings, in which—

Figure 1 is a transverse sectional view; Fig. 2, a top view, and Figs. 3 and 4 top views of modifications.

Like parts are represented by similar letters of reference.

It has been found in practice that tires formed of a single or continuous tread have a tendency when loaded to crowd over the sides of the retaining-channel, and, further, when the wheel is under action and load the rubber will have a tendency to creep or move longitudinally in the channel, or the longitudinal movement of the rubber will either be transmitted to the base, loosening it, or have a tendency to separate the base from the tread. I obviate this trouble by providing narrow pockets arranged preferably alternately on opposite sides of the tread, said pockets preferably extending near or past the center of the tread and down and out near the point where the rubber leaves the channel side. The pockets not only provide a place into which the rubber can flow, but break up the longitudinal movement, so as to keep it away from the base and its fastenings and retaining-channel. The tire is more resilient because of the extra length of rubber and reduced width which is in action at one time, and while the length and width as represented by the zigzag strip would not if arranged in a straight strip be sufficient to withstand the extreme shocks by my invention they hold together and take the nature of a cushion. I provide a wide and nearly-flat tread without danger of cutting over the retaining-channel sides, as the displacement of rubber is principally into the cavities. My improved tire also presents a continuous smooth surface to action.

In Figs. 1 and 2 the cavities are shown V-shaped or nearly sharp at their base. In Fig. 3 they are slightly V-shaped, but curved at their base. In Fig. 4 I show my improved tire with the cavities arranged opposite each other.

I have shown a flaring channel and retaining-wire passing through the base. However, any other well-known channel or seat and means of retaining the rubber in its seat can be used.

In Fig. 1, *a* represents the channel, and the rubber band *b* is preferably held in the channel *a* by retain-wires *c c*. The pockets *d* are preferably V-shaped and arranged alternating on opposite sides of the rubber band. The inner part of the pockets preferably extends past the center of the base and forms a zigzag tread. The bottom of the pockets extends down and out near the point where the tread leaves the channel sides, as shown in Fig. 1, thus leaving the base continuous.

It has been found in practice that in well-known sectional tires the sections individually are not able to withstand the extreme torsional strains. With my improved tire there are no sections as such, but the parts are interconnected, thus adding to their resisting power without destroying their individuality and resiliency, and providing an even tread-surface.

Having thus described my invention, what I claim as new, and desire to secure by Letters Patent, is—

1. The combination of a metallic channel, a rubber band, retaining-wires, and V-shaped pockets; said rubber band held in said channel by said retaining-wires, the said pockets located in the tread, or exposed part of said rubber band, and alternately on opposite sides of said base, forming a zigzag tread, for the purpose specified.

2. The combination of a metallic channel, a rubber band and pockets, and means for retaining said rubber band in said channel; said pockets located in the exposed part of said rubber band, and alternating on opposite sides of said exposed part of said rubber band, forming a continuous tread-surface, and folding so as to cushion one fold against another, for the purpose specified.

3. The combination of a rubber band for vehicle-wheels, a continuous base, and a tread portion connected to said base, and formed in a continuous zigzag shape by transverse cavities, alternating on opposite sides of said tread, the sides of said rubber tread adapted to cushion together under extreme loads, as and for the purpose specified.

4. The combination of a metallic channel, a rubber band, said rubber band held in said channel by independent retaining wires or bands, the exposed part of said rubber band having cavities in its side forming tread-sections, said tread-sections connected together alternately on opposite sides.

5. The combination of a metallic channel, a rubber base, a rubber tread, and means for holding said base in said channel, said tread attached to said base in sections and connected together alternately at opposite sides by a tread-section, forming zigzag sections adapted to cushion together under action of a load, for the purpose specified.

6. The combination of a metallic channel, a rubber band held in said channel by independent retaining-wires, the exposed part of said rubber band having narrow cavities in its sides, forming pockets which are adapted to cushion together or close under action of a load.

7. The combination of a metallic channel or base, a rubber band, and means for holding said band in said channel, the exposed part of said rubber band having narrow transverse cavities separating the exposed sides of said rubber band into sections, but forming a continuous central tread-surface.

8. The combination of a metallic channel, a rubber band, side transverse cavities or pockets and means for holding said rubber band in said channel, the exposed part of said rubber band formed into sections on its sides by said cavities, said sections in contact or connected together, forming a continuous center tread-surface, said cavities adapted to close forming a cushion, as and for the purpose specified.

9. The combination of a metallic channel or base, a rubber band, transverse cavities, and means for holding said band in said channel or base, the exposed side of rubber band formed in sections, the section on one side of said rubber band, in line with the cavity on the other side of said rubber band, forming tread-sections connected alternately at opposite ends.

In testimony whereof I affix my signature in presence of two witnesses.

ALVARO S. KROTZ.

Witnesses:
ROGER N. SMITH,
ALBERT F. BUSCH.